United States Patent
Liu et al.

(10) Patent No.: US 7,630,040 B2
(45) Date of Patent: Dec. 8, 2009

(54) LIQUID CRYSTAL DISPLAY AND MANUFACTURING METHOD THEREFOR COMPRISING ALIGNMENT FILMS OF ORIENTED CARBON NANOTUBES

(75) Inventors: Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 298 days.

(21) Appl. No.: 11/473,217

(22) Filed: Jun. 21, 2006

(65) Prior Publication Data
US 2007/0115413 A1    May 24, 2007

(30) Foreign Application Priority Data
Oct. 27, 2005   (CN) .......................... 2005 1 0100793

(51) Int. Cl.
*G02F 1/1337*   (2006.01)
(52) U.S. Cl. ....................... 349/123; 349/124; 349/128; 977/742; 977/755; 977/932
(58) Field of Classification Search .......... 349/123–124
See application file for complete search history.

(56) References Cited

U.S. PATENT DOCUMENTS 6,061,114 A    5/2000 Callegari et al.
6,485,614 B2*  11/2002 Katoh et al. ........... 204/157.15

OTHER PUBLICATIONS

J.M. Russell et al., Oct. 12, 2005, Thin Solid Films, pp. 53-57, Science Direct.*
Kaili Jiang et al., Spinning continuous carbon nanotube yarns, Nature, Oct. 24, 2002, pp. 801, vol. 419.

* cited by examiner

*Primary Examiner*—Andrew Schechter
*Assistant Examiner*—Paisley L Arendt
(74) *Attorney, Agent, or Firm*—D. Austin Bonderer

(57) ABSTRACT

A liquid crystal display (200) includes a first base plate (202), a second base plate (220), a liquid crystal layer (238) located between the first base plate and the second base plate, and two alignment films (210, 228). The two alignment films are respectively positioned on inner surfaces of the first base plate and the second base plate. Each alignment film is a film of oriented carbon nanotubes (212, 230). An oriented direction of the carbon nanotubes on the first base plate is perpendicular to that of the carbon nanotubes on the second base plate. A manufacturing method for the liquid crystal display is also disclosed.

14 Claims, 4 Drawing Sheets

LIQUID CRYSTAL DISPLAY AND MANUFACTURING METHOD THEREFOR COMPRISING ALIGNMENT FILMS OF ORIENTED CARBON NANOTUBES

BACKGROUND

1. Technical Field

The present invention relates to liquid crystal displays (LCDs) and manufacturing methods for the LCDs and, more particularly, to an LCD with alignment films and a manufacturing method for the LCD.

2. Description of the Related Art

Because LCDs have the advantages of portability, low power consumption, and low radiation, they have been widely used in various portable information products such as notebooks, personal digital assistants (PDAs), video cameras, and the like. Furthermore, LCDs are considered to have the potential to completely replace cathode ray tube (CRT) monitors and televisions.

Referring to FIG. 4, a conventional LCD 100 generally includes a first base plate 102, a second base plate 110, and a liquid crystal layer 118 located between the two base plates 102 and 110. An alignment layer 106 is formed on an inner surface 104 of the first base plate 102. An alignment layer 114 is formed on an inner surface 112 of the second base plate 110.

The liquid crystal layer 118 includes a plurality of rod-like liquid crystal molecules 120. A plurality of parallel fine grooves 108 is formed on an inner surface of the alignment layer 106. A plurality of parallel fine grooves 116 is formed on an inner surface of the alignment layer 114. Functions of the grooves 108 and 116 are to orient the liquid crystal molecules 120 in a homogeneous manner, i.e., to align the liquid crystal molecules 120 adjacent to the alignment layers 106 and 114 parallel to the grooves 108 and 116 respectively. When the grooves 108 and 116 are at right angles, the liquid crystal molecules 120 can automatically turn 90 degrees from top to bottom.

The alignment layers 106 and 114 are important to the LCD 100. Alignment qualities of the alignment layers 106 and 114 are one of the key factors that determine the display quality of the LCD 100. The alignment layers 106 and 114 can be made using a rubbing method. The rubbing method can be exemplified using the manufacturing method for the alignment layer 114 as below. The manufacturing method for the alignment layers 114 generally includes the steps of: coating a layer of alignment material, such as polyimide, on the inner surface 112 of the second base plate 110; and rubbing the surface of the alignment material using rubbing cloth to form the plurality of fine grooves 116.

However, some drawbacks arise from a mechanical contact of the rubbing cloth with the surface of the alignment material. This method is complicated because a baking process of the polyimide layer takes long time, and the rubbing introduces numerous electrostatic charges as well as plenty of dust contamination, which in turn needs other facilities and rinse process to eliminate. In addition, the rubbing cloth has a limited lifespan and needs to be replaced frequently.

What is needed, therefore, is an LCD with a good alignment quality and a simple manufacturing method therefor.

SUMMARY

An LCD according to an embodiment includes a first base plate, a second base plate, a liquid crystal layer located between the first base plate and the second base plate, and two alignment films. The two alignment films are respectively positioned on inner surfaces of the first base plate and the second base plate. Each alignment film is a film of oriented carbon nanotubes.

A manufacturing method for an LCD according to an embodiment includes the steps of: arranging a plurality of carbon nanotubes on a first base plate to form a first alignment film; arranging a plurality of carbon nanotubes on a second base plate to form a second alignment film; assembling the first base plate and the second base plate and making the first alignment film face the second alignment film to form a liquid crystal cell; and filling liquid crystal molecules into the liquid crystal cell.

Other advantages and novel features will become more apparent from the following detailed description of the present LCD and its manufacturing method, when taken in conjunction with the accompanying drawings.

BRIEF DESCRIPTION OF THE DRAWINGS

Many aspects of the present LCD and its manufacturing method can be better understood with reference to the following drawings. The components in the drawings are not necessarily to scale, the emphasis instead being placed upon clearly illustrating the principles of the present LCD and its manufacturing method. Moreover, in the drawings, like reference numerals designate corresponding parts throughout the several views.

DETAILED DESCRIPTION OF PREFERRED EMBODIMENTS

Reference will now be made to the drawings to describe preferred embodiment of the LCD and its manufacturing method, in detail.

Figure 1:
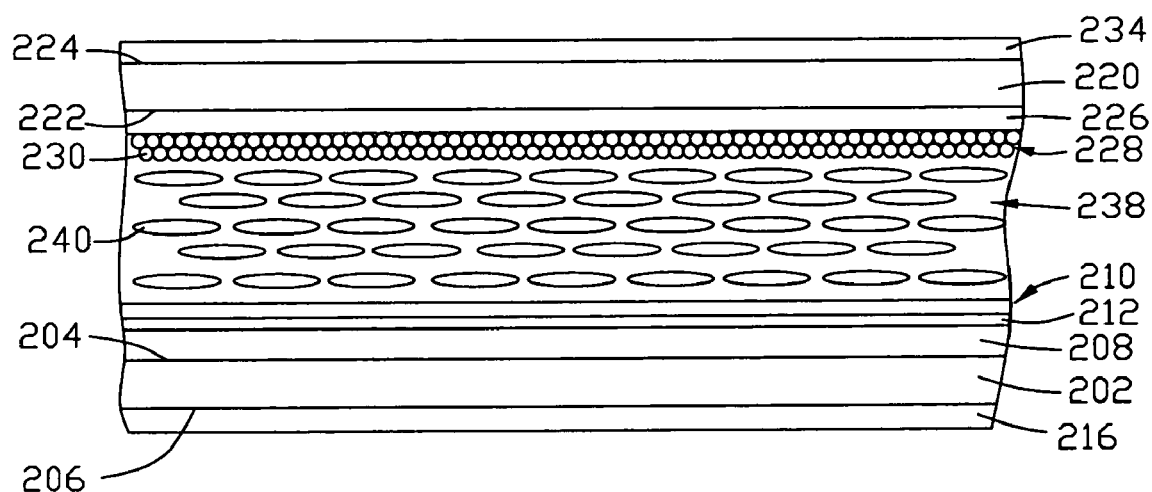
FIG. 1 is a schematic, plan view of an LCD in accordance with a preferred embodiment.
Figure 1:
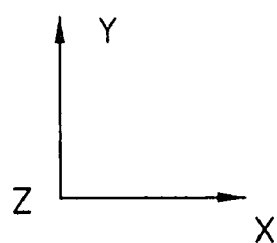

Referring to FIG. 1, an LCD 200 in accordance with a preferred embodiment is shown. The LCD 200 mainly includes a first base plate 202, a second base plate 220, and a liquid crystal layer 238.

The first base plate 202 is opposite to the second base plate 220. The liquid crystal layer 238 includes a plurality of rod-like liquid crystal molecules 240 and is located between the two base plates 202 and 220. A first transparent electrode layer 208 and a first thin film of carbon nanotubes 210 are positioned on an inner surface 204 of the first base plate 202 in that order. A first polarizer 216 is positioned on an outer surface 206 of the first base plate 202. A second transparent electrode layer 226 and a second thin film of carbon nanotubes 228 are positioned on an inner surface 222 of the second base plate 220 in that order. A second polarizer 234 is positioned on an outer surface 224 of the second base plate 220.

The first thin film of carbon nanotubes 210 includes a plurality of carbon nanotubes 212 oriented on the first transparent electrode layer 208 along the direction of x-axis. The carbon nanotube 212 can be selected from a group consisting of single-walled carbon nanotube (SWNT), multi-walled carbon nanotube (MWNT), single-walled carbon nanotube bundle (SWNT bundle), multi-walled carbon nanotube bundle (MWNT bundle), super-aligned MWNT yarn, and so on. The super-aligned MWNT yarn has been introduced by Kaili Jiang et al. in an article titled "spinning continuous carbon nanotube yarns" (Nature, vol. 419, pp. 801, 2002), the disclosure thereof is incorporated herein by reference. A thickness of the first thin film of carbon nanotubes 210 varies in accordance with kinds of the carbon nanotubes being adopted, i.e., the thickness can be equal to or slightly larger than a diameter of the carbon nanotube being adopted. For example, when a single layer of the SWNTs is adopted, the thickness of the first thin film of carbon nanotubes 210 can be about 1 nanometer. When the super-aligned MWNT yarns is adopted, the thickness of the first thin film of carbon nanotubes 210 can be up to 10 microns. A length of each carbon nanotube 210 can be equal to the width of the first base plate 202 in the direction of x-axis, and also can be shorter than this width.

Because the carbon nanotube 210 has a shape of round tube, every two adjacent carbon nanotubes 210 define a fine groove 214 (referring to FIG. 2) therebetween. Thus, the first thin film of carbon nanotubes 210 can align the liquid crystal molecules 240 adjacent thereto parallel to the grooves 214.

The structure and function of the second thin film of carbon nanotubes 228 are the same with the first thin film of carbon nanotubes 210, the difference is that carbon nanotubes 230 of the second thin film of carbon nanotubes 228 are oriented on the second transparent electrode layer 226 along the direction of z-axis.

Figure 2:
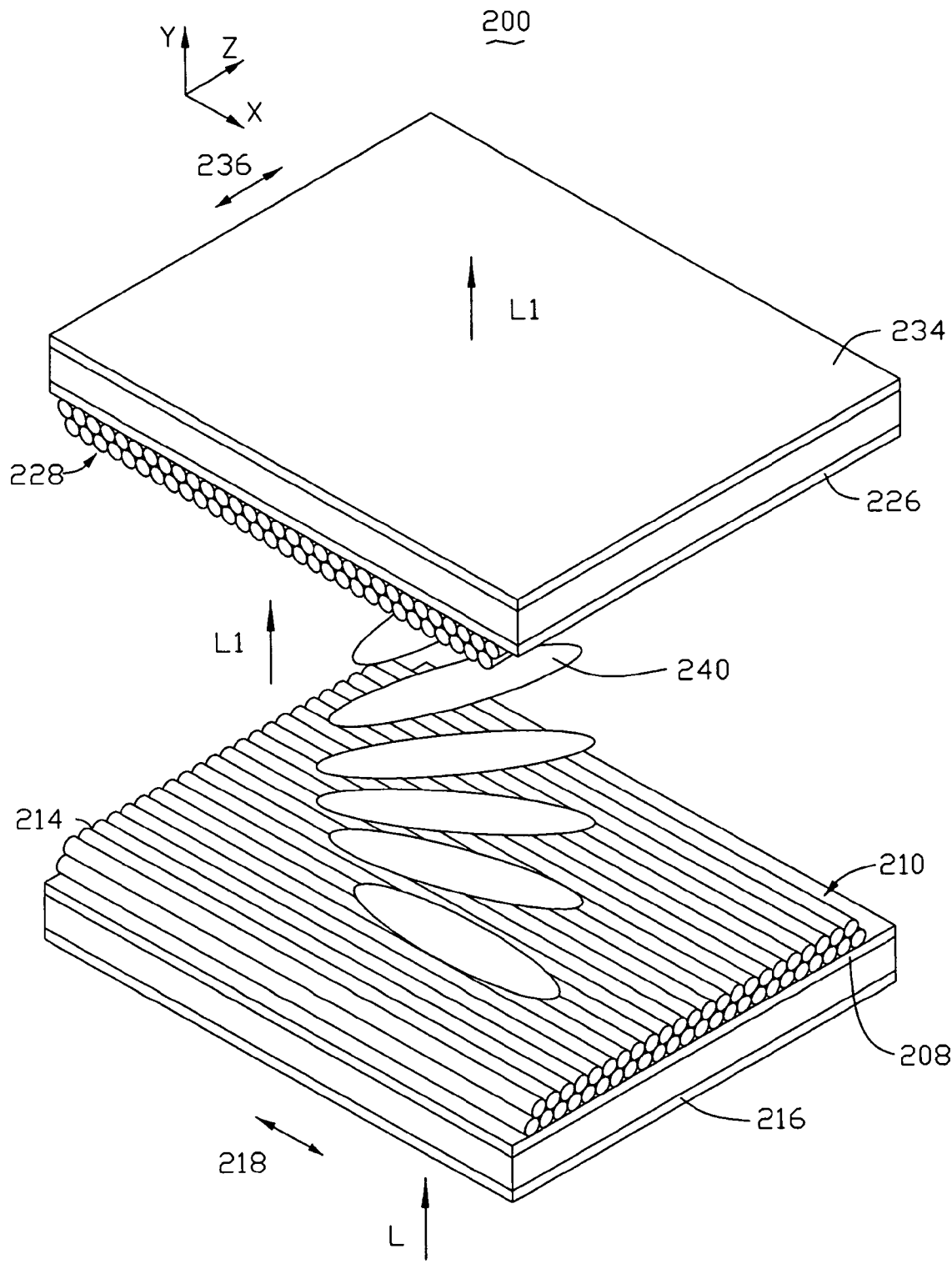
FIG. 2 is a schematic, isometric view of the LCD of FIG. 1 in a light transmitting state.

Referring to FIG. 2, when no voltage is applied to the transparent electrode layers 208 and 226, the arrangement of the liquid crystal molecules 240 is in accordance with alignment directions of the thin films of carbon nanotubes 210 and 228. In this embodiment, the alignment directions of the thin films of carbon nanotubes 210 and 228 are at right angles, so the liquid crystal molecules 240 can automatically turn 90 degrees from top to bottom. When incident light L is incident upon the first polarizer 216, because a transmission axis 218 of the first polarizer 216 is along the direction of x-axis, only polarization light L1 with a polarization direction parallel to the transmission axis 218 can pass through the first polarizer 216. During the polarization light L1 passes through the liquid crystal molecules 240, because the liquid crystal molecules 240 turn 90 degrees from top to bottom, the polarization direction of the polarization light L1 is also turned 90 degrees and is parallel to the direction of z-axis. The polarization light L1 passing through the liquid crystal molecules 240 can pass through the second polarizer 234 because a transmission axis 236 of the second polarizer 234 is along the direction of z-axis. As a result, the LCD 200 is in a light transmitting state.

Figure 3:
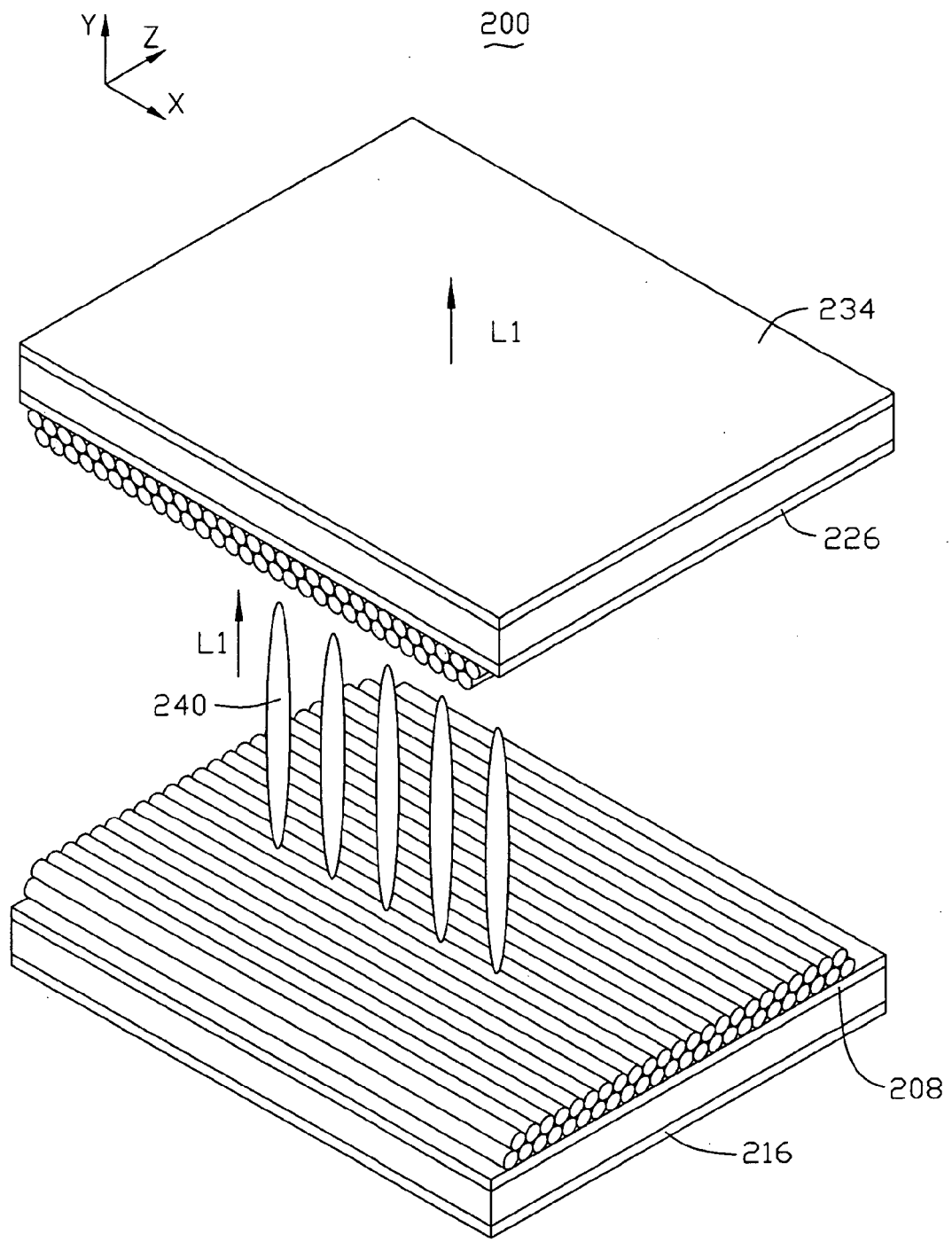
FIG. 3 is a schematic, isometric view of the LCD of FIG. 1 in a light blocking state.
Figure 4:
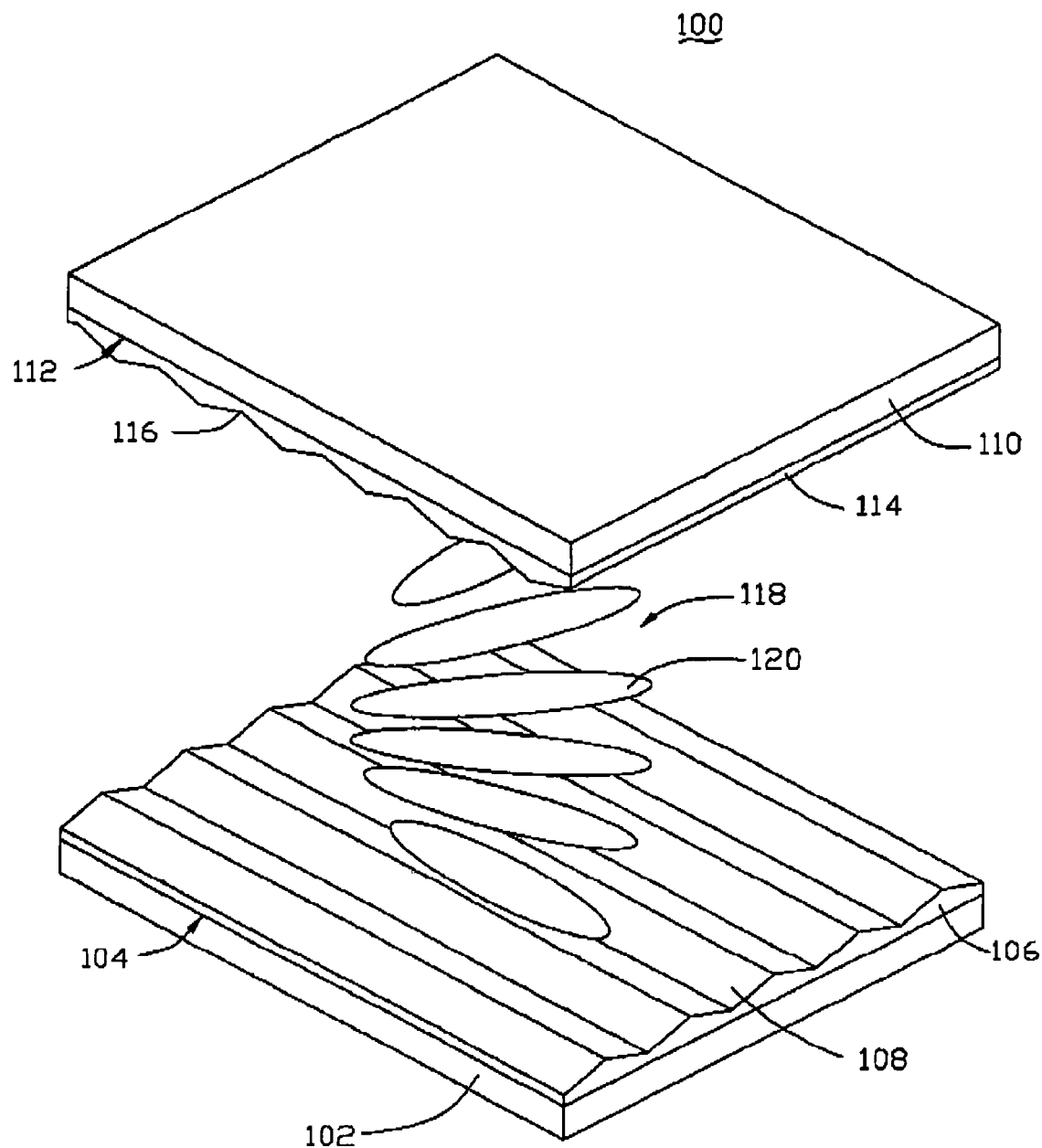
FIG. 4 is a schematic, isometric view of a conventional LCD.

Referring to FIG. 3, when there is voltage applied to the transparent electrode layers 208 and 226, an electrical field with a direction perpendicular to the transparent electrode layers 208 and 226 is formed. Under an influence of the electrical field, the arrangement of the liquid crystal molecules 240 is parallel to the direction of the electrical field. Now, the polarization light L1 passing through the liquid crystal molecules 240 cannot be turned and cannot pass through the second polarizer 234. As a result, the LCD 200 is in a light blocking state.

A manufacturing method for the present LCD in accordance with a preferred embodiment will be described with reference to FIG. 1 as below. The method mainly includes the steps of: arranging the plurality of carbon nanotubes 212 on the inner surface 204 of the first base plate 202 using a chemical vapor deposition method, a solution deposition method, or a directly laying method to form the first thin film of carbon nanotubes 210, wherein the carbon nanotube 210 can be selected from the group consisting of SWNT, MWNT, SWNT bundle, MWNT bundle, super-aligned MWNT yarn, and so on; forming the second thin film of carbon nanotubes 228 using the same method, wherein the plurality of carbon nanotubes 230 are arranged on the inner surface 222 of the second base plate 220 along the direction of z-axis; assembling the first base plate 202 and the second base plate 220 to form a liquid crystal cell; filling the liquid crystal molecules 240 into the cell to achieve the present LCD 200.

The present LCD utilizes carbon nanotubes as alignment material and no rubbing process is needed, so the problem of electrostatic charge and dust contamination can be avoided, and the present LCD manufacturing method can be simplified.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A liquid crystal display, comprising:
   a first base plate having an inner surface;
   a second base plate having an inner surface and being opposite to the first base plate;
   a liquid crystal layer located between the first base plate and the second base plate and being adjacent to the inner surfaces; and
   two alignment films respectively positioned on the inner surfaces of the first base plate and the second base plate, wherein each alignment film is a film of oriented carbon nanotubes that are not perpendicular to the surface of the respective base plate.

2. The liquid crystal display as claimed in claim 1, wherein the carbon nanotube is selected from a group consisting of single-walled carbon nanotube, multi-walled carbon nanotube, single-walled carbon nanotube bundle, multi-walled carbon nanotube bundle, and super-aligned multi-walled carbon nanotube yarn.

3. The liquid crystal display as claimed in claim 1, further comprising two polarizers respectively positioned on two outer surfaces of the first base plate and the second base plate, the outer surfaces being opposite to the liquid crystal layer.

4. The liquid crystal display as claimed in claim 1, further comprising a first transparent electrode layer located between the first base plate and the alignment film on the first base plate, and a second transparent electrode layer located between the second base plate and the alignment film on the second base plate.

5. The liquid crystal display as claimed in claim 1, wherein an oriented direction of the carbon nanotubes on the first base plate is perpendicular to that of the carbon nanotubes on the second base plate.

6. A liquid crystal display, comprising:
   an alignment flint wherein the alignment film is a film of oriented carbon nanotubes that are parallel to the a surface of the film.

7. The liquid crystal display as claimed in claim 6, wherein the carbon nanotube is selected from a group consisting of single-walled carbon nanotube, multi-walled carbon nanotube, single-walled carbon nanotube bundle, multi-wailed carbon nanotube bundle, and super-aligned multi-walled carbon nanotube yarn.

8. A manufacturing method for a liquid crystal display, comprising the steps of:
   arranging a plurality of carbon nanotubes on a first base plate to form a first alignment film;

arranging a plurality of carbon nanotubes on a second base plate to form a second alignment film such that the carbon nanotubes are not perpendicular to the a surface of the respective base plate;

assembling the first base plate and the second base plate and making the first alignment film face the second alignment film to form a liquid crystal cell; and filling liquid crystal molecules into the liquid crystal cell.

9. The manufacturing method as claimed in claim 8, wherein die carbon nanotubes are arranged on the base plates using one of a chemical vapor deposition method, a solution deposition method, and a directly laying method.

10. The manufacturing method as claimed in claim 8, wherein the carbon nanotube is selected from a group consisting of single-walled carbon nanotube, multi-walled carbon nanotube, single-walled carbon nanotube bundle, multi-walled carbon nanotube bundle, and super-aligned multi-walled carbon nanotube yarn.

11. The manufacturing method as claimed in claim 8, wherein an arranged direction of the carbon nanotubes on the first base plate is perpendicular to that of the carbon nanotubes on the second base plate.

12. The liquid crystal display as claimed in claim 1, wherein a length of each carbon wino tube is equal to or shorter than the a width of the first base plate.

13. The liquid crystal display as claimed in claim 1, wherein every two adjacent carbon nanotubes in the film define a groove.

14. The liquid crystal display as claimed in claim 13, wherein the liquid crystal comprises a plurality of liquid crystal molecules, the carbon nanotubes in the film align the liquid crystal molecules adjacent thereto parallel to the grooves.

* * * * *

UNITED STATES PATENT AND TRADEMARK OFFICE
CERTIFICATE OF CORRECTION

PATENT NO. : 7,630,040 B2  Page 1 of 1
APPLICATION NO. : 11/473217
DATED : December 8, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Second Day of November, 2010

David J. Kappos
*Director of the United States Patent and Trademark Office*